(12) United States Patent
Hindman

(10) Patent No.: US 7,093,496 B2
(45) Date of Patent: Aug. 22, 2006

(54) NON-INTRUSIVE PRESSURE SENSING DEVICE

(75) Inventor: Jahmy Jomont Hindman, Kangasala (FI)

(73) Assignee: Deere & Company, Moline, IL (US)

( * ) Notice: Subject to any disclaimer, the term of this patent is extended or adjusted under 35 U.S.C. 154(b) by 250 days.

(21) Appl. No.: 10/814,031

(22) Filed: Mar. 31, 2004

(65) Prior Publication Data
US 2005/0235755 A1    Oct. 27, 2005

(51) Int. Cl.
*G01L 7/00* (2006.01)
(52) U.S. Cl. ....................................................... 73/756
(58) Field of Classification Search .................. 73/714, 73/756; 602/1, 16; 600/587
See application file for complete search history.

(56) References Cited

U.S. PATENT DOCUMENTS

| | | | |
|---|---|---|---|
| 4,321,833 A | 3/1982 | Zeiringer | |
| 4,541,284 A | 9/1985 | Guagliumi et al. | |
| 5,111,826 A * | 5/1992 | Nasiff | 600/485 |
| 6,612,175 B1 | 9/2003 | Peterson et al. | |
| 6,872,187 B1 * | 3/2005 | Stark et al. | 602/16 |

\* cited by examiner

*Primary Examiner*—William Oen

(57) ABSTRACT

A none intrusive pressure sensing device that clamps on to a pressure line and detects the internal pressure of the pressure line by detecting the resultant changes in the diameter of the pressure line. The clamp is held together by a fastener having a sensing element, such as a strain gage, that is able to detect the change in length of the fastener as the pressure line and the clamp expand and contract with the internal pressure of the pressure line.

8 Claims, 3 Drawing Sheets

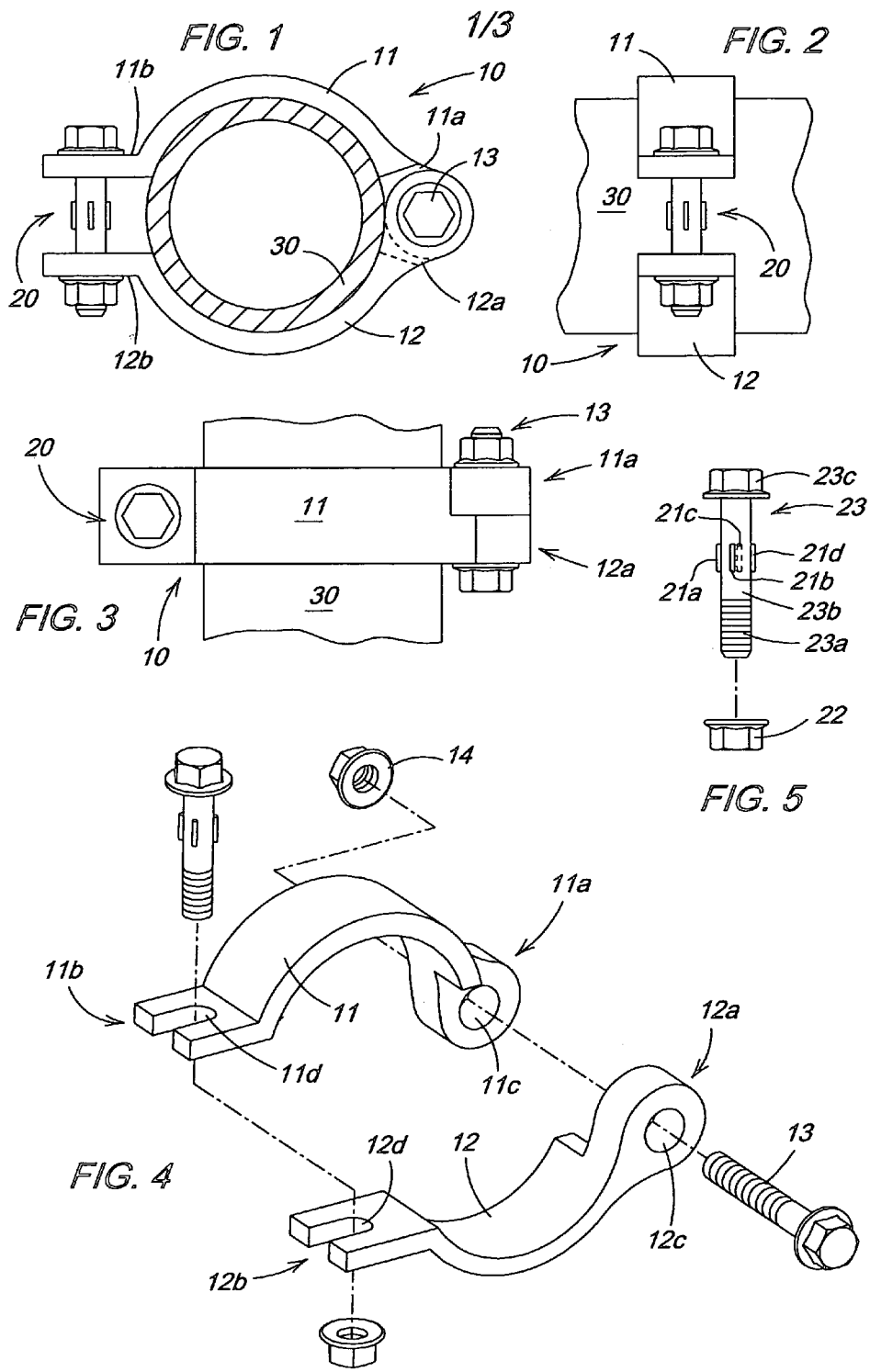

US 7,093,496 B2

NON-INTRUSIVE PRESSURE SENSING DEVICE

FIELD OF THE INVENTION

The invention relates to pressure sensors and, more particularly, relates to non-intrusive devices for detecting pressures of a pressurized fluid or gas in a pressure line without breaching a wall of the pressure line or contacting the fluid or gas inside the pressure line.

BACKGROUND OF THE INVENTION

Most conventional pressure transducers used to detect pressures in the pressure lines of machinery are intrusive, requiring exposure to the pressurized fluid or gas in the pressure line. This involves an assembly process requiring a breach in the wall of the pressure line or some other method of direct exposure of the pressure transducer to the pressurized fluid or gas.

SUMMARY OF THE INVENTION

The assembly processes for the intrusive transducers tend to increase assembly and maintenance costs for the machinery and to increase the potential for contamination of the fluid or gas. The complexity of some of the conventional non-intrusive pressure transducers tends to be costly and to make such transducers difficult to fabricate. The bulkiness of a remainder of the conventional non-intrusive pressure transducers tends to decrease the range of use, especially in machinery where space is at a premium.

Described herein is a device and method for non-intrusively detecting an internal pressure of a pressure line. A clamp with two arms is closed over the outer diameter of the pressure line for a snug fit having first ends of the clamp arms pivotally connected and second ends of the clamp arms connected by a sensor fastener. As the internal pressure in the pressure line increases and decreases, the outer diameter of the pressure line expands and contracts causing a diameter of the clamp to expand and contract and the length of the sensor fastener to change. The sensor fastener includes a sensing element that detects the length of the sensor fastener as it changes with the pressure.

BRIEF DESCRIPTION OF THE DRAWINGS

Embodiments of the invention will be described in detail, with references to the following figures, wherein:

FIG. 1 is a side view of an exemplary embodiment of the clamping cuff assembly of the invention;

FIG. 2 is a front view of the clamping cuff assembly of FIG. 1;

FIG. 3 is a top view of the clamping cuff assembly of FIG. 1;

FIG. 4 is an exploded view of the clamping cuff assembly of FIG. 1;

FIG. 5 is a view of an exemplary embodiment of a sensor fastener;

DESCRIPTION OF THE PREFERRED EMBODIMENT

Figure 6:
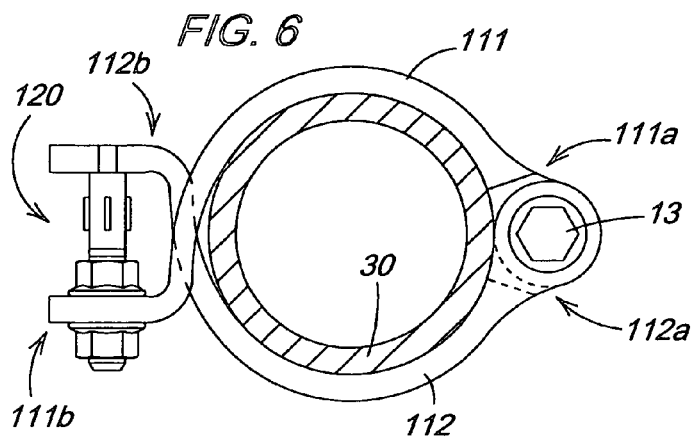
FIG. 6 is a side view of a second embodiment of the clamping cuff assembly of the invention.
Figure 8:
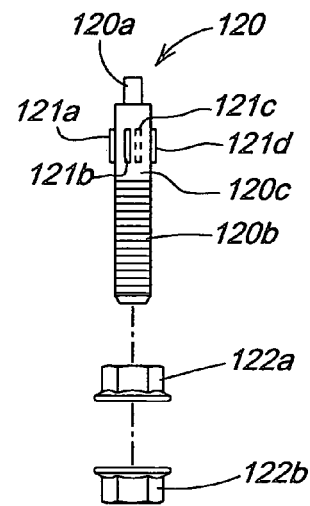
FIG. 8 is a top view of the clamping cuff assembly of Fib. 6.

FIG. 1 is a side view of an exemplary embodiment of the clamping cuff assembly of the invention. As illustrated in FIG. 1 as well as FIGS. 2–4, the clamping cuff assembly includes a clamping cuff 10 and a sensor fastener 20.

The clamping cuff 10 includes: a first arm 11 having a first arm first end 11a and a first arm second end 11b; a second arm 12 having a second arm first end 12a and a second arm second end 12b; a bolt 13 and a nut 14. The nut 14 and bolt 13 pivotally connect the first arm 11 and the second arm 12 via holes 11c and 12c in the first arm first end 11a and the second arm first end 12a, respectively, as illustrated in FIGS. 1–4. The first arm and second arms 11, 12 are made of strong and relatively rigid materials. These materials include, but are not limited to, aluminum and steel.

Figure 11:
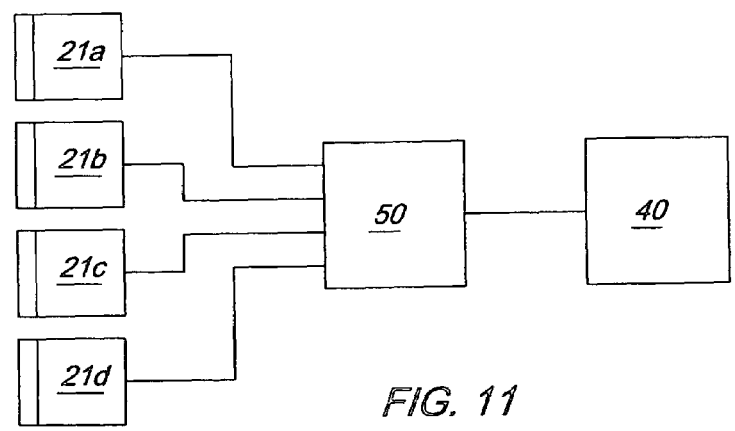
FIG. 11 is a functional diagram illustrating the connections between strain gages, a controller and a display.

As illustrated in FIG. 5, the sensor fastener 20 includes four strain gages 21a–21d, a nut 22 and a bolt 23 having a threaded portion 23a, a shank 23b and a head 23c. The nut 22 is a conventional locking nut. The four strain gages 21a–21d are attached at equal angular positions around the circumference of the shank 23b. The strain gages 21a–21d are then electrically connected to a conventional measuring device or controller 50 for receiving signals from the strain gages 21a–21d, converting those signals to read in units of pressure, and displaying the converted results on a display 40 as illustrated in FIG. 11.

In operation, the first and second cuff arms 11, 12 are placed around the pressure line 30. The first arm second end 11b and the second arm second end 12b are then connected via the sensor fastener 20, slot 11d and slot 12d as illustrated in FIGS. 1–4. Finally the sensor fastener 20 is tightened, i.e., pre-loaded in tension for a snug fit between the pressure line 30 and the cuff assembly 10.

As the pressure line 30 expands and contracts with increasing and decreasing internal pressure, the shank 23b lengthens and shortens accordingly as the sensor fastener 20 holds the cuff assembly 10 together via tension. Thus, the strain gages 21a–21d detect any changes in a length of the sensor fastener 20 as they, i.e., the strain gages 21a–21d, lengthen and shorten in concert with the shank 23b.

Figure 7:
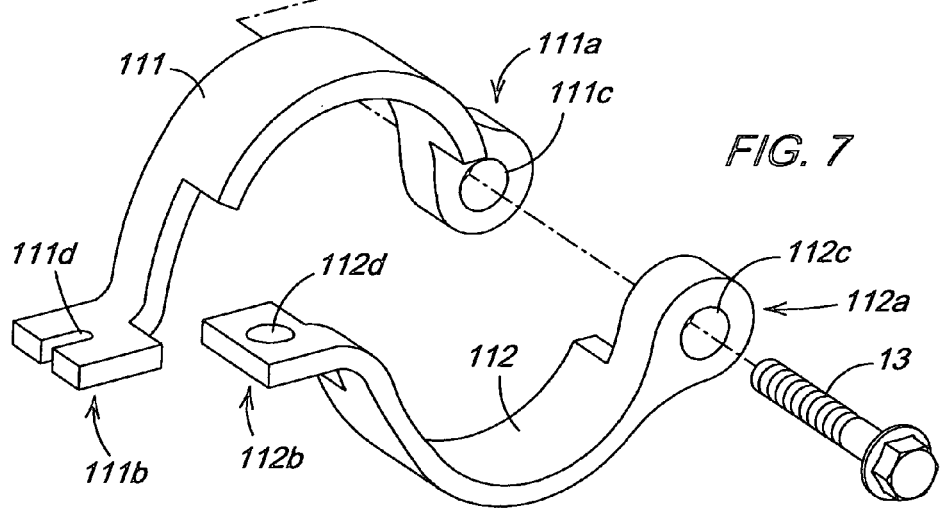
FIG. 7 is a front view of the clamping cuff assembly of FIG. 6.

FIG. 6 is a side view of a second embodiment of the clamping cuff assembly of the invention comprising: a first arm 111 having a first arm first end 111a and a first arm second end 111b; a second arm 112 having a second arm first end 112a and a second arm second end 112b; and a sensor fastener 120 including two nuts 122a, 122b, a screw 123, and four strain gages 121a–121d. The first arm second end 111b includes a slot 111d and the second arm second end 112b includes a hole 112d. The screw 123 includes a first connecting portion 123a, a second connecting portion 123b and a shank 123c. All other components remain the same as in the first embodiment. As illustrated in FIGS. 6 and 7, in this particular embodiment the first arm second end 111 and the second arm second end 112 extend past each other. Thus, in the second embodiment of the invention, the sensor fastener 120 is compressive as it holds the clamping cuff assembly 100 together via a compressive load. The compressive nature of the sensor fastener 120 is the primary functional difference between the first and second embodiments of the invention. The pivotal connection between the first arm first end 111a and the second arm first end 112a is established after the first arm 111 and the second arm 112 are placed in position about the pressure line 30 to avoid interference between the first arm second end 111b and the second arm second end 112b.

In operation the first and second arms 111, 112 of the clamping cuff 100 are placed around the pressure line 30 and held in place by assembling the sensor fastener 120 as illustrated in FIGS. 6 and 7. The first arm first end 111a and the second arm first end 112a are then pivotally connected via the holes 111c and 112c using the nut 14 and the bolt 13. Finally, as indicated in FIG. 6, the sensor fastener 120 is assembled by: placing the first connecting portion 120a into the hole 112d; sliding the second connecting portion into the slot 111c such that nuts 122a and 122b are on opposite sides of the slot 111d; and adjusting the nuts 122a and 122b for a frictional connection to the opposite sides of the slot 111d as well as a compressive pre-load on the shank 120c. The sensor fastener 120 then, respectively, shortens and lengthens as the clamp 100 expands and contracts with the internal pressure of the pressure line 30.

Figures 9, 10:
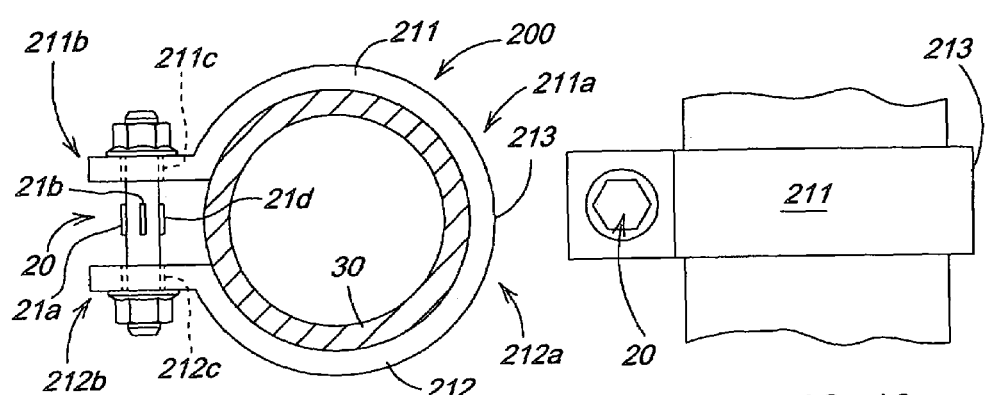
FIG. 9 is a side view of a third embodiment of the clamping cuff assembly of the invention.
FIG. 10 is a top view of the clamping cuff assembly of FIG. 9.

FIG. 9 illustrates a third exemplary embodiment of the invention. This embodiment is essentially the same as the first embodiment illustrated in FIG. 1. However in this embodiment the clamp 200 comprises a first flexible arm 211 with a first arm first end 211a and a first arm second end 211b; a second flexible arm 212 with a second arm first end 212a, and a second arm second end 212b. In this particular embodiment, the first ends 211a, 212a are directly joined and indistinguishable from each other as the first and second flexible arms comprise a single and continuous piece of flexible material. The flexible material may include, but is not limited to, nylon and leather.

Having described the illustrated embodiment, it will become apparent that various modifications can be made without departing from the scope of the invention as defined in the accompanying claims.

What is claimed is:

1. A non-intrusive pressure transducer for detecting a pressure in a pressure line, the pressure line having an inner diameter and an outer diameter, the pressure transducer comprising:
    a clamping cuff including a first arm having a first arm first end and a first arm second end, a second arm having a second arm first end and a second arm second end, the first and second arms being joined at the first portion first end and the second portion first end;
    a sensor fastener for connecting the first arm second end and the second arm second end such that the first cuff and the second cuff fit snugly over the outer diameter of the pressure line to form a clamping cuff assembly, the sensor fastener having a diameter and comprising at least one attached strain gage, the clamping cuff assembly expanding and contracting as the pressure line expands and contracts, the pressure line expanding and contracting as the pressure increases and decreases, a length of the sensor fastener changing as the clamping cuff assembly expands and contracts, the at least one strain gage detecting the length of the sensor fastener.

2. The non-intrusive pressure transducer of claim 1, wherein the sensor fastener is tensile.

3. The non-intrusive pressure transducer of claim 1, wherein the sensor fastener is compressive.

4. The non-intrusive pressure transducer of claim 1, wherein the at least one strain gage comprises four strain gages equally spaced over the diameter of the sensor fastener.

5. The non-intrusive pressure transducer of claim 1, wherein the sensor fastener comprises a load cell.

6. The non-intrusive pressure transducer of claim 1, wherein at least one of the first arm and the second arm comprises a flexible portion of high tensile strength.

7. The non-intrusive pressure transducer of claim 6, wherein the flexible portion is formed from chainmail.

8. A method of detecting a pressure in a pressure line with a non-intrusive pressure transducer, the pressure transducer including a clamping cuff and a sensor fastener, the clamping cuff including: including a first arm having a first arm first end and a first arm second end, a second arm having a second arm first end and a second arm second end, the first and second cuff arms being joined at the first arm first end and the second arm first end; and a sensor fastener to connect the first arm second end and the second arm second end, the sensor fastener including at least one attached strain gage, the method comprising:
    attaching the clamping cuff to the pressure line by fitting the first and second arms about the outer diameter of the pressure line;
    connecting the first arm second end and the second arm second end with the sensor fastener to form a clamping cuff assembly;
    allowing the clamping cuff assembly to expand and contract as the pressure increases and decreases and the pressure line expands and contracts accordingly, a length of the sensor fastener changing as the clamping cuff assembly expands and contracts; and
    detecting the length of the sensor fastener via the at least one strain gage.

* * * * *